(12) United States Patent
Konshin et al.

(10) Patent No.: US 12,480,318 B2
(45) Date of Patent: Nov. 25, 2025

(54) GANTRY-TYPE 3D PRINTER

(71) Applicant: AC3D, INC., San Francisco, CA (US)

(72) Inventors: Dmitrij Konshin, Balashiha (RU); Boris Kozlov, Moscow (RU)

(73) Assignee: AC3D, INC., San Francisco, CA (US)

( * ) Notice: Subject to any disclaimer, the term of this patent is extended or adjusted under 35 U.S.C. 154(b) by 76 days.

(21) Appl. No.: 18/691,879

(22) PCT Filed: Jul. 15, 2022

(86) PCT No.: PCT/RU2022/050223
§ 371 (c)(1),
(2) Date: Mar. 13, 2024

(87) PCT Pub. No.: WO2023/043333
PCT Pub. Date: Mar. 23, 2023

(65) Prior Publication Data
US 2024/0301704 A1 Sep. 12, 2024

(30) Foreign Application Priority Data
Sep. 15, 2021 (RU) .......................... RU2021127090

(51) Int. Cl.
*E04G 21/04* (2006.01)
*B33Y 30/00* (2015.01)

(52) U.S. Cl.
CPC ..... *E04G 21/0445* (2013.01); *E04G 21/0427* (2013.01); *B33Y 30/00* (2014.12)

(58) Field of Classification Search
None
See application file for complete search history.

(56) References Cited

U.S. PATENT DOCUMENTS 8,029,710 B2 * 10/2011 Khoshnevis ........... B25J 19/002
212/312
10,061,323 B2 * 8/2018 Muck .................. G05D 1/0278
(Continued)

FOREIGN PATENT DOCUMENTS

CN 105710294 A 6/2016
CN 205766713 U * 12/2016 ......... E04G 21/0463
(Continued)

OTHER PUBLICATIONS

Official English Translation of International Search Report for corresponding PCT/RU2022/050223, dated Nov. 3, 2022.
(Continued)

*Primary Examiner* — Yung-Sheng M Tsui
*Assistant Examiner* — Melody Tsui
(74) *Attorney, Agent, or Firm* — FITCH EVEN TABIN & FLANNERY LLP

(57) ABSTRACT

A gantry-based 3D printer contains two vertical columns, connected with each other by a horizontal fixed beam, designed with the possibility of moving along rail guides. The rails are mounted on the printer base. A cross beam is installed on the vertical columns designed with the possibility of moving in the vertical direction; and the carriage with the print head attached to it and the possibility of longitudinal movement is mounted on the cross beam. The rails are equipped with an alignment system, which contains washers, nuts and screws, the latter of which are embedded in the base of the printer. The vertical columns and a cross beam are equipped with V-shaped rails with an additional leveling system, and the vertical columns and a cross beam are moved by roller carriages with the help of a drive and helical rack.

5 Claims, 3 Drawing Sheets

(56) References Cited

U.S. PATENT DOCUMENTS

| | | | | |
|---|---|---|---|---|
| 2003/0161708 | A1* | 8/2003 | Johnston | B66C 19/005 |
| | | | | 414/460 |
| 2007/0181519 | A1* | 8/2007 | Khoshnevis | E04G 21/0463 |
| | | | | 212/180 |
| 2020/0199862 | A1* | 6/2020 | Le Roux | E04G 21/0427 |
| 2020/0282593 | A1* | 9/2020 | Le Roux | E04G 21/04 |
| 2022/0281170 | A1* | 9/2022 | Sergison | B29C 64/227 |

FOREIGN PATENT DOCUMENTS

| | | | | |
|---|---|---|---|---|
| CN | 110593589 A | * | 12/2019 | ........... E04G 21/246 |
| KR | 101526827 B1 | | 6/2015 | |
| RU | 161181 U1 | | 4/2016 | |
| RU | 2640551 C1 | | 1/2018 | |

OTHER PUBLICATIONS

Original Written Opinion of the International Searching Authority in corresponding PCT/RU2022/050223, dated Oct. 6, 2022.

* cited by examiner

GANTRY-TYPE 3D PRINTER

FIELD

The invention relates to the construction and robotic engineering sector, and to the area of construction robotic systems in particular; and can be used as a unit for autonomous layer-by-layer build-up of buildings structures and constructions as well as for mechanical surface treatment.

BACKGROUND

The 3D printer for erecting an insulated concrete wall is known from the prior art (see [1] RF U.S. Pat. No. 2,744,829, IPC E04B 2/00, B33Y 10/00, publ. 16.03.2021); it consists from supporting units: X-axis, Y-axis, Z-axis, upper cantilever, vertical and longitudinal carriages, printing head, milling head, feed system joint, boom, and distribution unit.

The disadvantage of this version is the structural complexity, high cost, on account of four vertical columns, and as a consequence, the need to use a large number of drives. The limited printing area due to the finite dimensions of the printer axes is also one of the main disadvantages.

The 3D printer is known from the prior art (see Ref. [2] South Korean patent No. 101526827, IPC B22F3/105; B28B1/00; B29C67/00; published 5 Jun. 2015); it contains several variants of embodiment: with four support columns or with two support columns.

The disadvantage of this version is the complexity of construction, high cost, on account of four vertical columns, and as a consequence, the need to use a large number of drives. A more effective solution is the design of a U-shaped gantry moving in the longitudinal direction on rails, but this solution has the size limitations of the printed product as well, due to the final dimensions of the axes of the printer itself.

Cobod created a printer (see [3] cobod.com/bod2/) that implements a design with modular scalable axes. But this design uses a variant of the layout with four vertical columns, the disadvantages of which are described above. In addition, the modular beams are made as welded metal structures, in which case, if it is necessary to keep the straightness of the entire axis assembly, it implies the use of complex technological tooling, increasing the cost and time of manufacturing the printer. Plus a U-bar is used as a guide for rollers. This design offers deviations from straightness when moving along the guides of carriages or beams, or installation additional adjustable rollers that limit such deviations. However, even using such rollers, it is not always possible to achieve the desired effect, since welded beams involve significant deviations in geometry from the straightness of their surfaces. Thus, this design does not provide sufficient printing accuracy.

The variant of beams with mechanical treatment of surfaces for guide installation is technically labor-intensive; it implies the use of milling machines with a large treatment area and, in the end, still does not ensure the absence of deviations from the shape of the mounting surfaces without significant time expenditures and the use of high-precision equipment.

The closest analog, taken as a prototype, is a multifunctional construction gantry robot (see [4] Russian Federation patent for utility model No. 161181, IPC B25J 11/00, E04G 21/02, publ. Oct. 4, 2016). The gantry is moving on guide rails. There is a carriage located on the gantry with the ability to move in a direction perpendicular to the direction of the rails track, actuators and a controller designed to control the actuators, besides the gantry contains telescopic columns with the ability to move vertically in its upper part, and the carriage is provided with an autonomous system for layer-by-layer build-up of building and structures, containing a manipulator with a built-in compounding extruder, designed with the possibility of off-line preparation of building mixture and its subsequent extrusion; and the end link of the manipulator is equipped with a module for fixing the processing tool with the possibility of rotating the tool around the vertical and horizontal axes.

The telescopic columns are a disadvantage of the prototype, they reduce the reliability of the device as a whole while increasing the cost of the device.

SUMMARY

The task of the claimed invention is to expand the possibilities of construction 3D printing due to the design with scalable axes, while reducing the time and complexity of the printer manufacturing technology in comparison with known solutions.

The technical result is the expansion of functional capabilities, acceleration and simplification of the process of manufacturing and assembly of the construction of the printer, increase in versatility and applicability.

A gantry-based 3D printer is intended for achieving goal and reaching the stated technical result. It has two vertical columns, designed with the possibility of moving along the rail guides and connected with each other by a horizontal fixed beam, the rail guides are installed on the printer base, and a cross beam with the possibility of longitudinal movement is mounted on vertical columns with possibility of movement in vertical direction and is equipped with a carriage fixed thereon; and the rail guides are equipped with an alignment system which contains washers, nuts and screws, the last of which are mounted in the printer base. Vertical columns and the cross beam are equipped with V-shaped rail guides with an additional alignment system. Vertical columns and the cross beam are moved by roller carriages by means of a drive and helical rack.

Besides, the issue is addressed, and the technical result is accomplished due to additional leveling system equipped with a base with grooves, in which a pair of wedges with the ability to move with the help of adjusting screws is installed. A cradle is installed in the wedges using grooves, and a V-shaped rail guide is installed on the cradle, and the cradle has a through groove with a screw passing through it and pressing the V-shaped rail guide and the cradle to the base.

And the issue is also addressed and the technical result is accomplished thanks to cradle's adjusting screws, allowing fixing V-shaped rails in the required position.

And the issue is also addressed and the technical result is accomplished due to the fact that the vertical columns, horizontal fixed beam and cross beam have a modular design and consist of sections.

And finally the issue is also addressed and the technical result is accomplished due to the fact that the rail guides have a modular design and consist of sections.

10—V-shaped rail guide; 11—screw pressing the V-shaped rail guide and cradle (9) to the base; 12—carriage roller; 13—carriage; 14—adjusting screw for fixing the position of the V-shaped rail; 15—adjusting screw for moving and fixing the wedges; 16—rail alignment system screw; 17—rail alignment system nut; 18—rail alignment system washer.

DETAILED DESCRIPTION

Figure 1:
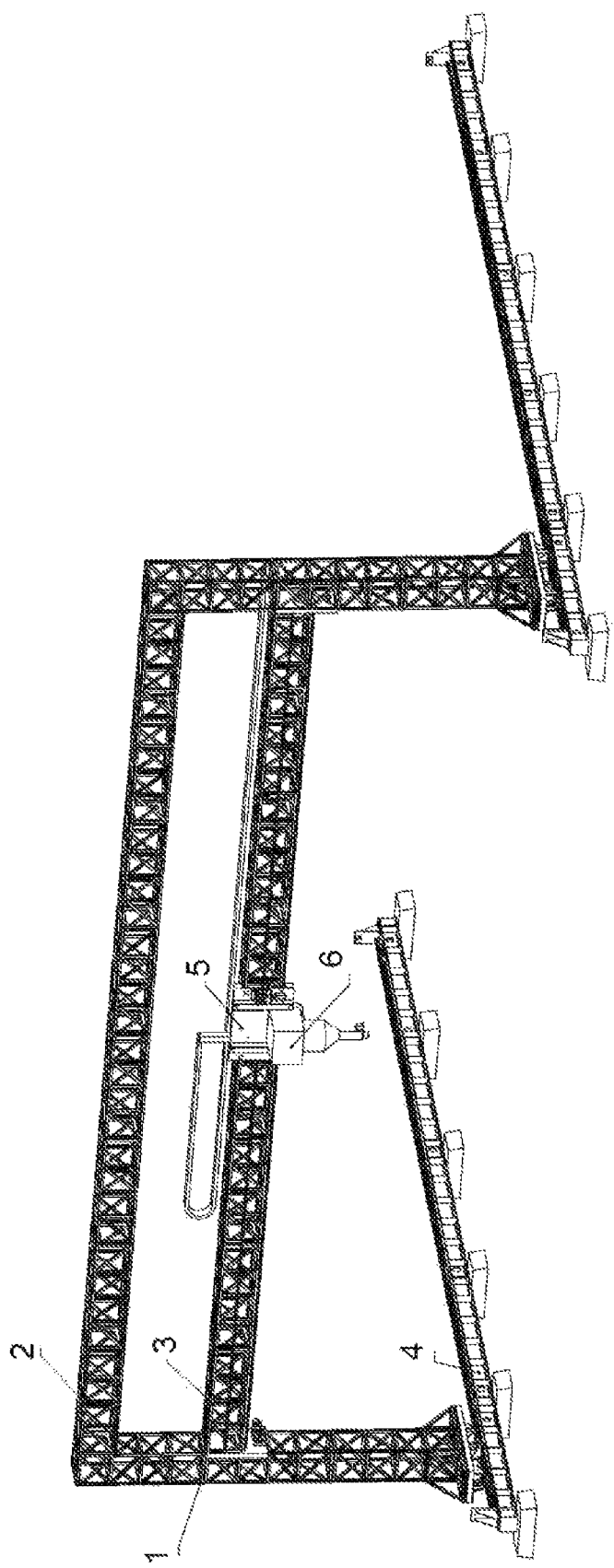
FIG. 1—Image of the printer
FIG. 2—Optional V-rail alignment system
FIG. 3—Rail alignment system
The figures indicate the following positions: 1—vertical column; 2—fixed beam; 3—cross beam; 4—rail guide; 5—carriage; 6—print head; 7—base; 8—wedge; 9—cradle.

The claimed 3D printer (FIG. 1) consists of two vertical columns (1), which are designed with the possibility to move on rails (4). The rail guides (4) are mounted on the base of the printer. The vertical columns (1) are connected to each other by a horizontal fixed beam (2). The cross beam (3) with the carriage (5) having the possibility of longitudinal movement is mounted on the vertical columns with the possibility of moving in the vertical direction. The print head (6) is attached to the carriage (5). The essential difference from other designs consists in the fact that vertical columns (1), horizontal fixed beam (2) and cross beam (3) have a modular design and include identical elements-sections (sections can be identical or of several standard sizes at the customer's request). Vertical columns (1) and a cross beam (3) are equipped with V-shaped rails (10) and a helical rail (not shown in the figures) to realize the drive, i.e. the movement of vertical columns (1) and a cross beam (3) is carried out by means of carriages (13) with rollers (12) due to the drive and helical rail.

The rails (4) also have a modular design and consist of sections (sections can be identical or of several sizes as required by the customer) and are installed on concrete pads or piles (printer base) at the joints of the sections. The modular design and interchangeability allows speeding up and simplifying the process of manufacturing and assembly of the structure; and, most importantly, realizing a scalable design of the printer, thus increasing its versatility and applicability.

Figure 3:
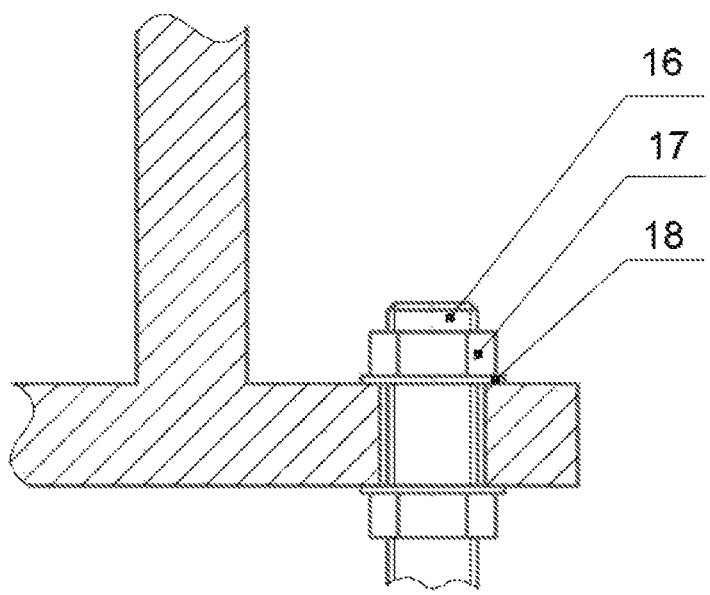

The rails (4) are equipped with a leveling system (FIG. 3), which compensates for ground variation and allows the structure to be accurately aligned with respect to the zero level provided in the print object. The leveling system contains washers (18), nuts (17) and screws (16). Adjustment is accomplished by the nuts (17), which are mounted via the washers (18) to the screws (16) in the printer base on which the rails (4) rest. The gaps between the screws (16) and the rail guides (4) allow alignment to be performed. This system improves the accuracy and smooth running of the printer and reduces the amount and time of work required to prepare the base.

Figure 2:
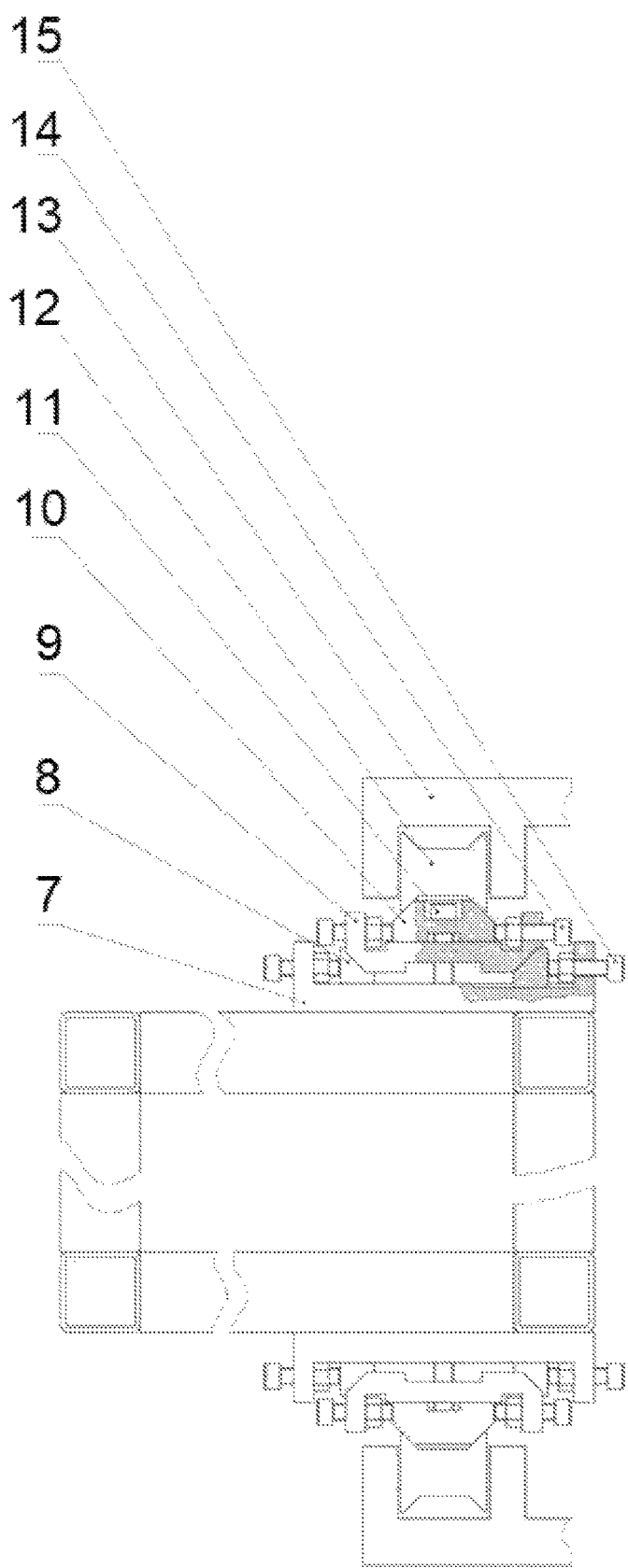

Also, a significant difference from the existing modular structures is an additional system of V-shaped rails (10) alignment on each section of the cross beam (3) and each section of vertical columns (1) (FIG. 2). The system allows the position of the V-rail guide (10) to be adjusted vertically and horizontally. The additional leveling system contains a base (7) with grooves, in which a pair of wedges (8) is mounted with the possibility of movement by means of adjusting screws (15). With the help of the adjusting screws (15) the wedges are driven to the desired position. A cradle (9) is installed in the wedges (8) by grooves, and a V-shaped rail (10) is installed on the cradle (9). The cradle (9) has a through groove through which a screw (11) passes to press the V-shaped rail (10) and the cradle (9) against the base (7). At the same time, the screws (11) are used to press the wedges (8) through the inclined surfaces against the adjusting screws (15) and against the base (7). The base (9) also has grooves in which the wedges (8) are inserted. The grooves on the base (7) and the cradle (9) allow the wedges (8) to be fixed in the longitudinal direction with respect to the guide. The cradle (9) has adjusting screws (14) to fix the V-rails (10) in the required position.

Alignment of V-rails (10) is necessary not only to ensure straightness of the beam assembly, but also to eliminate backlashes and gaps between the carriage (13) with rollers (12) and V-rails (10).

The use of V-shaped rails is also a special feature of the design. This shape allows implementing a self-aligning design and together with the alignment system described above eliminates unintended backlashes and gaps completely, which allows achieving high accuracy and smooth running of the printer.

The invention claimed is:

1. A gantry-based 3D printer comprising:
two vertical columns connected with each other by a horizontal fixed beam and configured for moving along rail guides;
rails mounted on a base of the 3D printer;
a cross beam installed on the vertical columns and configured to move in a vertical direction; and
a print head carriage with a print head attached thereto mounted on the cross beam and configured to move in a longitudinal direction,
wherein the rails are equipped with an alignment system containing washers, nuts, and screws;
wherein the screws are embedded in the base of the 3D printer;
wherein the vertical columns and the cross beam are equipped with V-shaped rail guides including a leveling system, and
wherein the vertical columns and the cross beam are moved by rail carriages including rollers via a drive and a helical rack.

2. The 3D printer according to claim 1, wherein the leveling system contains a base with grooves having a pair of wedges installed therein and configured to move via adjusting screws, and wherein a cradle is installed in the wedges via the grooves, and wherein and a V-shaped rail guide is mounted on the cradle, and wherein the cradle has a groove with a screw passing therethrough and pressing the V-shaped rail guide and the cradle to the base of the leveling system.

3. The 3D printer according to claim 2, wherein the cradle has adjustment screws for fixing the V-shaped rail guides in position.

4. The 3D printer according to claim 1, wherein each of the vertical columns, the horizontal fixed beam, and the cross beam have a modular design and includes multiple sections.

5. The 3D printer according to claim 1, wherein the rails have a modular design and include multiple sections.

* * * * *